United States Patent
Gafni et al.

(10) Patent No.: US 12,500,684 B2
(45) Date of Patent: Dec. 16, 2025

(54) SYSTEMS AND METHODS FOR OPTICALLY CONNECTING PROCESSING DEVICES AND INTERFACES

(71) Applicant: MELLANOX TECHNOLOGIES, LTD., Yokneam (IL)

(72) Inventors: Barak Gafni, Sunnyvale, CA (US); Henning Lysdal, Roskilde (DK)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 80 days.

(21) Appl. No.: 18/070,840

(22) Filed: Nov. 29, 2022

(65) Prior Publication Data

US 2024/0178929 A1    May 30, 2024

(51) Int. Cl.
*H04J 14/02* (2006.01)
*H04B 10/25* (2013.01)

(52) U.S. Cl.
CPC .............. *H04J 14/02* (2013.01); *H04B 10/25* (2013.01)

(58) Field of Classification Search
CPC .................................. H04B 10/25; H04J 14/02
USPC .......................................................... 398/79
See application file for complete search history.

(56) References Cited

U.S. PATENT DOCUMENTS

| | | | | |
|---|---|---|---|---|
| 9,225,454 B1 * | 12/2015 | Liu | ............... | H04J 14/02 |
| 10,634,844 B1 * | 4/2020 | Lin | ............... | G02B 6/2938 |
| 10,826,613 B1 | 11/2020 | Liang et al. | | |
| 10,908,369 B1 * | 2/2021 | Mahdi Hayder | .... | G02B 6/4206 |
| 11,026,001 B1 * | 6/2021 | Frankel | ............... | H04Q 11/0005 |
| 11,159,238 B1 * | 10/2021 | Di Mola | ............ | H04B 10/2581 |
| 11,169,330 B2 | 11/2021 | Lysdal et al. | | |
| 11,336,376 B1 * | 5/2022 | Xie | ............... | H04B 10/572 |
| 2012/0008947 A1 * | 1/2012 | Adhikari | ............... | H04J 14/0286 398/58 |
| 2015/0093117 A1 * | 4/2015 | Rahn | ............... | H04B 10/588 398/115 |
| 2021/0392419 A1 | 12/2021 | Meister et al. | | |
| 2022/0029379 A1 * | 1/2022 | Kovsh | ............... | H01S 5/50 |
| 2022/0043214 A1 | 2/2022 | Lysdal et al. | | |
| 2022/0123841 A1 * | 4/2022 | Frankel | ............... | H04B 10/801 |
| 2024/0146418 A1 * | 5/2024 | Johnson | ............... | H04B 10/27 |

OTHER PUBLICATIONS

U.S. Appl. No. 17/867,889, filed Jul. 19, 2022, Lysdal et al.
Extended Search Report for European Patent Application No. 23212975.9, dated May 2, 2024, 9 pages.

\* cited by examiner

*Primary Examiner* — Dalzid E Singh
(74) *Attorney, Agent, or Firm* — Sheridan Ross P.C.

(57) ABSTRACT

A system including multiple processing devices such as application-specific integrated circuits (ASICs). Each processing device is provided with light at one or more wavelengths. Each processing device outputs data, at the wavelength of the optical signal received, to one or more interfaces. Each interface outputs a multiplexed signal containing data from each of the processing devices on a single optic fiber.

24 Claims, 10 Drawing Sheets

SYSTEMS AND METHODS FOR OPTICALLY CONNECTING PROCESSING DEVICES AND INTERFACES

FIELD OF THE INVENTION

The present disclosure relates generally to processing devices and particularly to systems and methods of providing optical communication between a processing device and an interface.

BACKGROUND

Data centers that handle substantial amounts of data commonly utilize devices such as high-capacity switches and/or servers. These devices send and receive data to and from multiple other devices and/or network locations. Such devices may include one or more application-specific integrated circuits (ASICs). The ASICs in each device connect to one or more interfaces on a panel of the device. Via these interfaces, the ASICs of each device are enabled to communicate with other, external devices. Communication between devices should be as lossless and as fast as possible, for example at data rates reaching hundreds of Tb/s.

BRIEF SUMMARY

Embodiments of the present disclosure that are described herein provide improved internal connections between ASICs or other devices within a system, such as a switch, server, or other electrical device, and interfaces or ports on an external panel of the system, such as an FR4 interface. Such internal connections provide for greater communication efficiency, fewer required cables between systems, and other benefits.

There is therefore provided herein, in accordance with an embodiment of the present disclosure, an optical connection between two or more ASICs and one or more interfaces. Using a connection system as described herein, each ASIC may be enabled to send and/or receive optical signals to and/or from an interface at a particular one of a plurality of wavelengths. The connection system includes multiple optical fibers, configured for connecting to an ASIC at one side and an optical interface at the other side. In some embodiments, each ASIC may be capable of converting data to an optical signal for output to the optical interface via a respective optical fiber. Each ASIC may be capable of outputting data onto a respective optical fiber at a particular wavelength or range of wavelengths. An optical interface may receive optical signals from, for example, four ASICs, each operating at different wavelengths or ranges of wavelengths. As a result, the optical interface may be capable of outputting a multiplexed signal containing data from each of a plurality of ASICs onto a single optical fiber.

In a disclosed embodiment, a system such as a switch or a server comprises four ASICs or other processing devices each connected to one or more optical interfaces such as a 400GBASE-FR4 module. Each ASIC receives a light source at a different wavelength from a respective light source such as an external laser source (ELS) or from a light or laser source embedded as part of an ASIC package or on a same board as the ASIC. Each light source may provide a stream of light (e.g., a constant stream of light or continuous wave) to one or more electrical-to-optical (E-O) converter(s) in the ASIC package or on a same board as the ASIC package. Each ASIC, for example with one or more E-O converters, may modulate a signal onto this stream of light. In this way, each ASIC may output data onto an optical fiber using the received light at the same wavelength as received. The data output by each ASIC may be received by an optical interface. The optical interface may multiplex the received signals from each ASIC such that the system may be connected to a network device via a single optical fiber carrying data to and/or from each ASIC.

It should be appreciated that any one of the disclosed embodiments may be implemented in combination with any one or more other embodiments, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Additional features and advantages are described herein and will be apparent from the following description and the figures.

BRIEF DESCRIPTION OF THE DRAWINGS

The present disclosure will be more fully understood from the following detailed description of the embodiments thereof, taken together with the drawings in which.

DETAILED DESCRIPTION OF EMBODIMENTS

Figure 1:
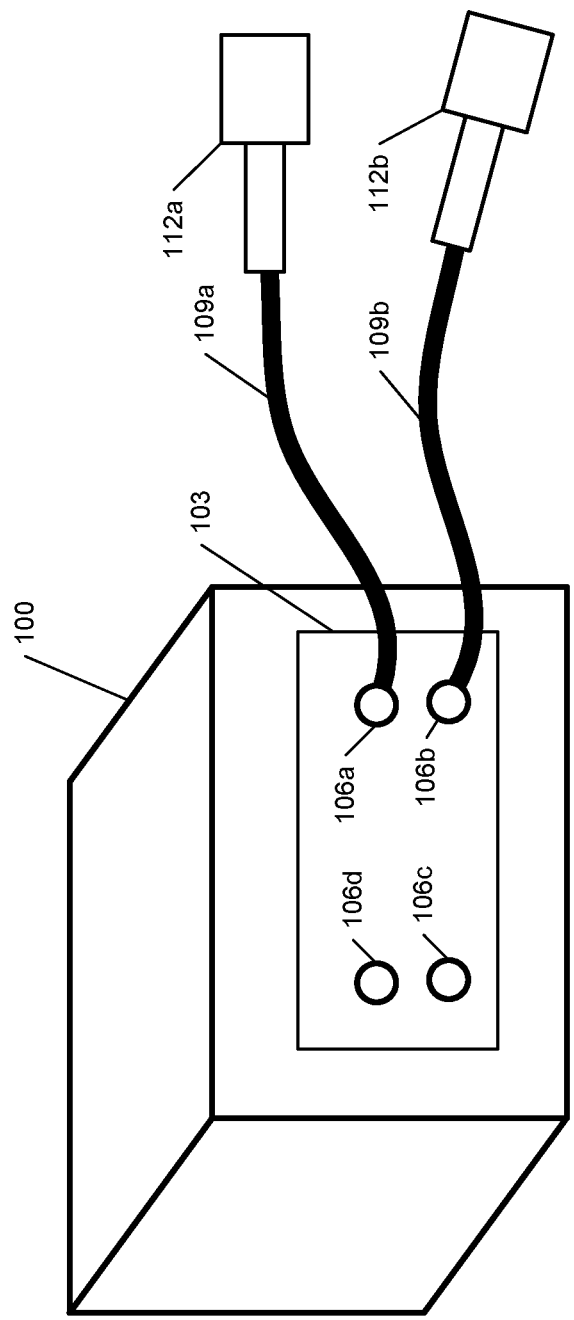
FIG. 1 is an illustration of a computing system connected to devices via optic fibers in accordance with an embodiment of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or optical links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

High-capacity optical switch assemblies switch multiple channels of data at high data rates, with the number of channels reaching several hundreds and data rates reaching hundreds of Gb/s (Gb/s=$10^9$ bits per second). To save power, it may be desirable to co-package the switch itself with "optical engines," which are often small, high-density optical transceivers located within an ASIC or within an ASIC package together with the switch.

The switch assembly may be contained in a rack-mounted case, with optical receptacles on its front panel for ease of access. The signals from and to the ASIC are conveyed to and from the optical receptacles using optical fibers.

Space constraints of the switch and the front panel limit the number of optical fibers connected to the ASIC and optical receptacles on the panel. Therefore, the optical signals emitted and received by the switch are multiplexed using wavelength-division multiplexing, so that each fiber, along with the associated optical receptacle, carries multiple optical signals. For example, each fiber may carry four channels of 100 Gb/s each, at four different, respective wavelengths, to and from the corresponding optical receptacle, for a total data rate of 400 Gb/s (denoted as 4×100 Gb/s).

In many cases, the multiple communication channels carried at different wavelengths on the same fiber are directed to and from different network nodes. For example, each of the 100 Gb/s component signals on a 4×100 Gb/s optical link may be directed to a different server. What is needed is a connection system capable of connecting one or more ASICs or other processing devices within a system such as a server or switch with one or more optical interfaces. As described herein, each ASIC may output data at a different wavelength to one or more optical interfaces. Each optical interface may be capable of outputting multiplexed data from a plurality of processing devices.

Embodiments described herein address the above needs by providing an ability to connect systems comprising a plurality of ASICs using a single optical fiber, such as a high-speed switch, at one end, and that provides respective electrical signals to multiple nodes, such as servers, at the other end.

Although the description herein, for the sake of simplicity, refers to transmission of signals from a system to a network node, in embodiments of the present invention, an optical cable may be configured for transmitting wavelength-multiplexed signals in two directions between the system and the node. In such embodiments, the optical fibers may comprise four fiber pairs (rather than four single fibers).

FIG. 1 illustrates a system 100 comprising a panel 103 with a plurality of optical interfaces 106. In the example illustrated in FIG. 1, two interfaces 106 of the system 100 are connected with external optical cables 109. With one end of an external optical cable 109 connected to an interface 106 of the system 100, a second end 112 of the cable 109 may be connected to another system. The interface 106 may be capable of outputting multiplexed data from one or more processing devices, such as ASICs, within the system 100 onto a cable 109. In at least one embodiment, each interface may connect to four processing devices within the system 100 via internal optical cables, though it should be appreciated other numbers of processing devices, such as 2, 3, 5, 6, . . . , 10, or more, as well as other data rates, may be used in alternative embodiments as described herein. Furthermore, optical cables of the sort in accordance with embodiments of the present disclosure may be used not only in this sort of connections between systems such as switches and servers, but also in other applications in which network nodes are connected using optical wavelength multiplexing.

Current state of the art architectures for network-connected computing systems such as servers, switches, and other components which may be used in environments such as data centers involve systems comprising multiple host-application specific integrated circuits (ASICs). Current methods of outputting data from host-ASICs within such systems suffer from poor power efficiency and lossy connections.

As described herein, a system 100 for connecting processing devices such as ASICs to one or more optical interfaces such as an FR4 within a computing system such as a switch or server enables the processing devices to communicate with devices external the system via a single optical fiber. Such a system overcomes issues related to conventional connection systems which are inadequate for supporting systems with multiple closely-integrated packages of host-ASICs. A system as described herein provides a low cost and efficient power architecture as compared to conventional systems.

Traditionally, a system 100 may comprise a single ASIC within its chassis and multiple interfaces or ports. Each port may be connected to the ASIC via a plurality of cables (e.g., a group of four wires). Newer, contemporary, systems include multiple ASICs with electrical wires within the chassis connecting each ASIC to one or more ports. Each port of such a system may be associated with a transceiver at or near the panel or chassis of the system which converts an electrical signal to an optical signal.

Conventional approaches for integrating optics with host-ASICs use either wavelength division multiplexing (WDM) optical interfaces or multiple optical interfaces in parallel using signals of the same wavelength. Neither WDM interfaces nor parallel interfaces can form an external WDM interface that include lanes from different host-ASICs using only optics and without moving back to an electrical domain. As should be appreciated, current solutions require converting signals from electrical to optical. This conversion results in a lossy communications and inadequately low speeds. What is needed is a system avoiding the conversion of electrical to and from optical, resulting in a simplified system with lossless communication capabilities.

As illustrated in FIG. 1, a system 100 in accordance with one or more embodiments as described herein may comprise a chassis or a panel 103 on a face of the chassis. The panel 103 may be affixed to one or more optical interfaces 106*a-d*. Interfaces 106*a-d* may be pluggably connectable to one or more external optical fiber cables 109*a*, 109*b*. Via optical fiber cables 109*a*, 109*b*, processing devices within the system 100, such as ASICs, may be capable of communicating with one or more external systems 112*a*, 112*b*.

Each external optical fiber cable 109*a*, 109*b*, may comprise one or more optical fibers. The single optical fiber may be capable of receiving and carrying an optical signal from the optical interface 106*a-d* of the system 100. The optical signal from the optical interface 106*a-d* may be a four-wavelength signal such as a 400GBASE-FR4 and operate at, for example, 400 Gb/s with four lanes, each at 100 Gb/s.

A system 100 as described herein may be capable of performing as one or more of a switch, a server, or other computing device. For example, the system 100 may be a network connected device including a plurality of processing devices such as ASICs. The system 100 may be capable of sending and receiving data optically to and/or from other systems 100 via optical fiber connections.

While the system and methods described herein relate to a system 100 transmitting data, it should be appreciated the same or similar systems and methods may involve a system 100 receiving data. The system and methods for transmitting data as described herein may relate in the same or a similar way to receiving data.

The interfaces 106*a-d* of the system 100 may include optical interfaces. For example, one or more of the interfaces 106*a-d* of the system 100 may include FR4 and/or DR4 optical interfaces in accordance with IEEE 802.3 400GBASE-FR4, -DR4, -SR4.2, etc.

It should be appreciated the systems and methods described herein may be used with FR4 interfaces as well as any other form of interface. The present disclosure is intended to cover any type of high-speed pluggable interface and may assume any suitable type of known or yet-to-be developed form factor, such as which may be capable solely of hosting an optical connector. The systems and methods described herein may be used in relation to any form of optical signals sent using any type of protocol relating to, for example, WDM, coarse wavelength division multiplexing (CWDM), dense wavelength division multiplexing (DWDM), 400GBASE-FR4, 400GBASE-DR4, 400GBASE-SR4.2, etc., or any combination thereof.

Each interface may be capable of outputting data onto a single optical fiber using multiple lanes. For example, an interface may utilize CWDM technology to output a plurality of lanes of data onto one strand of fiber. In some embodiments, an interface may utilize DWDM to output a plurality of lanes of data onto a single strand of fiber.

Each lane of data may be spaced by, for example, 0.4 nm, 0.8 nm, 20 nm, etc., depending on the technology being used to output data. For example, CWDM may utilize 20 nm while DWDM may utilize 0.4 or 0.8 nm.

Each optical interface may be capable of multiplexing optical signals received by the optical interface from one or more processing devices within the system 100 onto a single optical fiber using, for example, CWDM or DWDM. The single optical fiber may carry the optical signals simultaneously to one or more network locations. Such network locations may be one or more of a switch, a server, a storage device, etc. As should be appreciated, the system 100 may be capable of communicating with other multi-ASIC systems similar to or the same as the system 100. In this way, a plurality of systems as described herein may form a multi-switch network and may serve as, for example, an Ethernet network for a datacenter.

In some embodiments, an optical interface 106*a-d* may comprise a pluggable optical interface. The pluggable optical interface may be supported by a PCB. The optical interface may be capable of connecting to a 400GBASE-FR4 or 400GBASE-DR4 optical transceiver module which may be hot-pluggable and of a form factor of, for example, QSFP-DD. The optical interface may be compliant to IEEE 802.3 standards.

Figure 2:
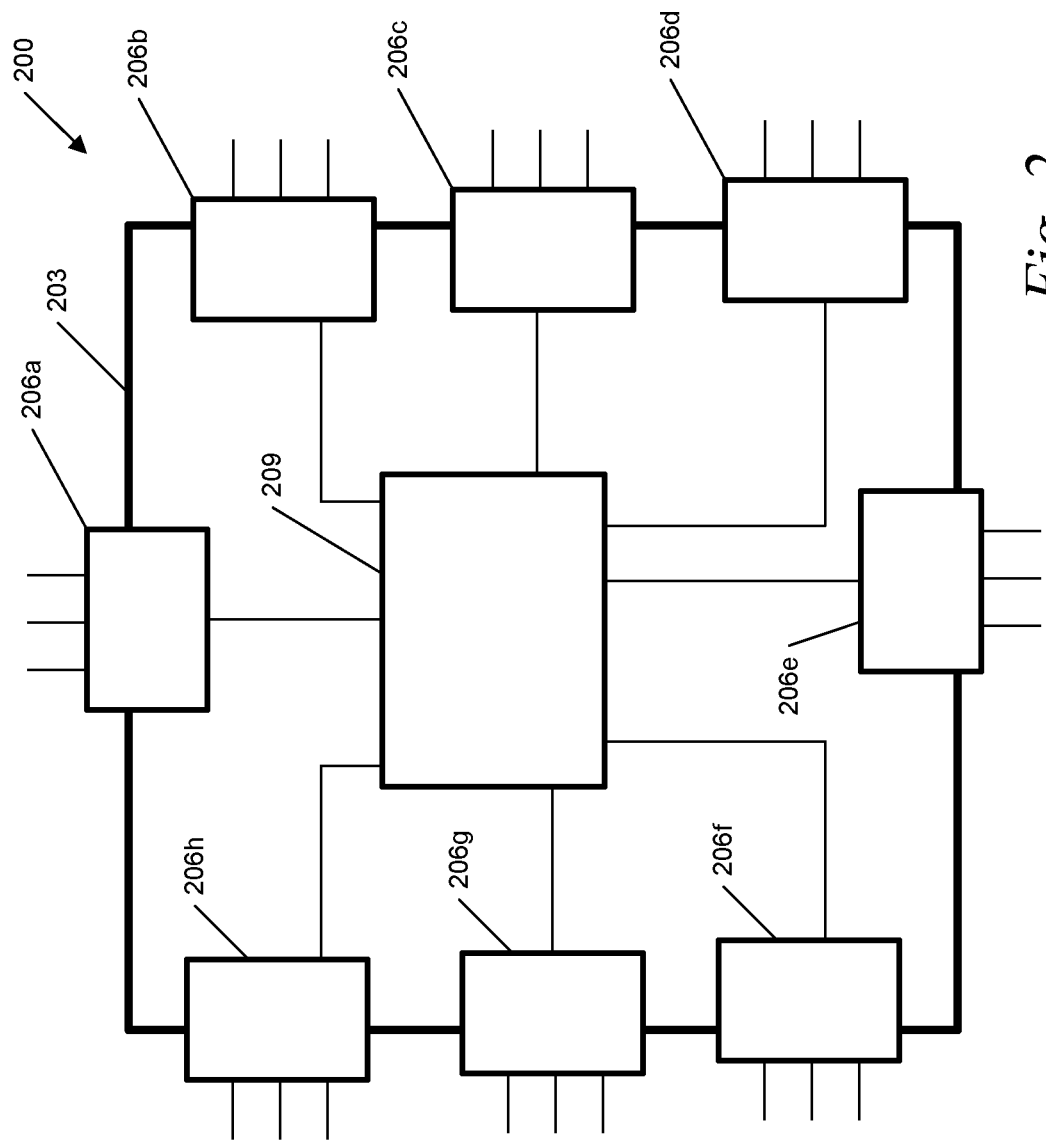
FIG. 2 is an illustration of a processing device in accordance with an embodiment of the present disclosure.

As illustrated in FIG. 2, a processing device 200 may comprise a PCB 203 or other form of substrate. It should also be appreciated that in some embodiments, a plurality of processing devices 200 may be installed on a single PCB or substrate. The PCB or substrate may further comprise one or more optical chips which may be used to convert electrical signals to and from optical signals. In this way, optical signals may be used to communicate from the PCB to the interface at the panel of the system 100. Any electrical signals used by one or more processing devices 200 may be converted at the PCB or at the processing device 200 itself.

The processing device 200 may further comprise one or more I/O ports 206*a-h* such as optical interfaces. Each I/O port 206*a-h* may be capable of receiving and/or transmitting optical signals. The I/O ports 206*a-h* of the processing device 200 may be transceivers and may be on-package or near-package.

In some embodiments, each I/O port 206*a-h* may be designated for transmitting or receiving optical signals. For example, a first I/O port 206*a* may be dedicated to receiving optical signals and a second I/O port 206*b* may be dedicated to transmitting data.

In accordance with one or more of the embodiments described herein, a processing device 200 may be capable of receiving an optical signal via one or more I/O ports 206a-d at one or more particular wavelength or range of wavelengths. The optical signal may be received from, for example, an external laser source (ELS) as described herein. The processing device 200 may also be capable of outputting data via one or more I/O ports 206a-d at one or more particular wavelengths or range of wavelengths.

In one or more of the embodiments described herein, the processing device 200 may be co-packaged with an electrical to optical (E-O) converter and/or an optical-to-electrical (O-E) converter. The processing device 200 may further comprise a serializer/de-serializer (SerDes) which may be an outermost part of the I/O port 206b. As used herein, an I/O port 206a-h of a processing device 200 may comprise one or more of an E-O converter, a SerDes, and/or one or more other components. Via an I/O port 206a-h and/or other components, the processing device 200 may be capable of converting electrical signals to and from optical signals.

For example, and as described in greater detail below, a processing device 200 may receive an optical signal via a first I/O port 206a at a first wavelength. The processing device 200 may output data by adding the data to the received optical signal and outputting a resulting optical data signal via a second I/O port 206b. Using this receiving and transmitting of optical signals, the processing device 200 may be capable of transmitting data to network devices at the same wavelength as the received optical signal. In this way, a system architect may be capable of controlling the wavelength or wavelengths at which a particular processing device 200 communicates by providing the processing device 200 an optical signal from an ELS at a particular wavelength or range of wavelengths.

The I/O ports 206a-h may be connectable to one or more optical interfaces 106 via optical fibers. Using such optical fibers, the optical data signal output by a processing device 200 may be received by an optical interface 106 on a panel of the system 100 as described herein.

The processing device 200 may further comprise an integrated circuit (IC) 209 such as a silicon die, which may operate as a switch, an ASIC, or other computing device. The IC 209 may be connected to one or more of the I/O ports 206a-h via traces in the PCB 203 or other means.

A processing device 200 may comprise an ASIC and/or may be capable of performing as a central processing unit (CPU), a graphics processing unit (GPU), a network interface card (NIC), a data processing unit (DPU), or any other computing device in which with data is received and/or transmitted.

The processing device 200 illustrated in FIG. 2 may be one or many in a system 100. For example, in one or more embodiments described herein, a system 100 may comprise four or more processing devices 200. For example, a processing device 200 may comprise co-packaged optics and/or near-packaged optics. The system 100 may comprise a plurality of processing devices 200 packaged as a co-packaged optics (CPO) or a near-packaged optics (NPO) device in which a plurality of processing devices 200 are on a single PCB capable of supporting two or more processing devices. In some embodiments a system 100 may comprise one or more processing devices 200 on a single PCB, one or more processing devices 200 on separate PCBs, or some combination thereof. For example, in a single system 100, two or more processing devices may be on a first PCB and one or more other processing devices 200 may be on a second PCB. It should be appreciated a system 100 may comprise any combination of CPO and/or NPO devices. In some embodiments, a processing device as described herein may comprise an ASIC co-packaged with one or more optical-electrical converters. In some embodiments, a processing device may comprise an ASIC may be connected to one or more optical-electrical converters elsewhere in the system and external to the processing device.

Figure 3:
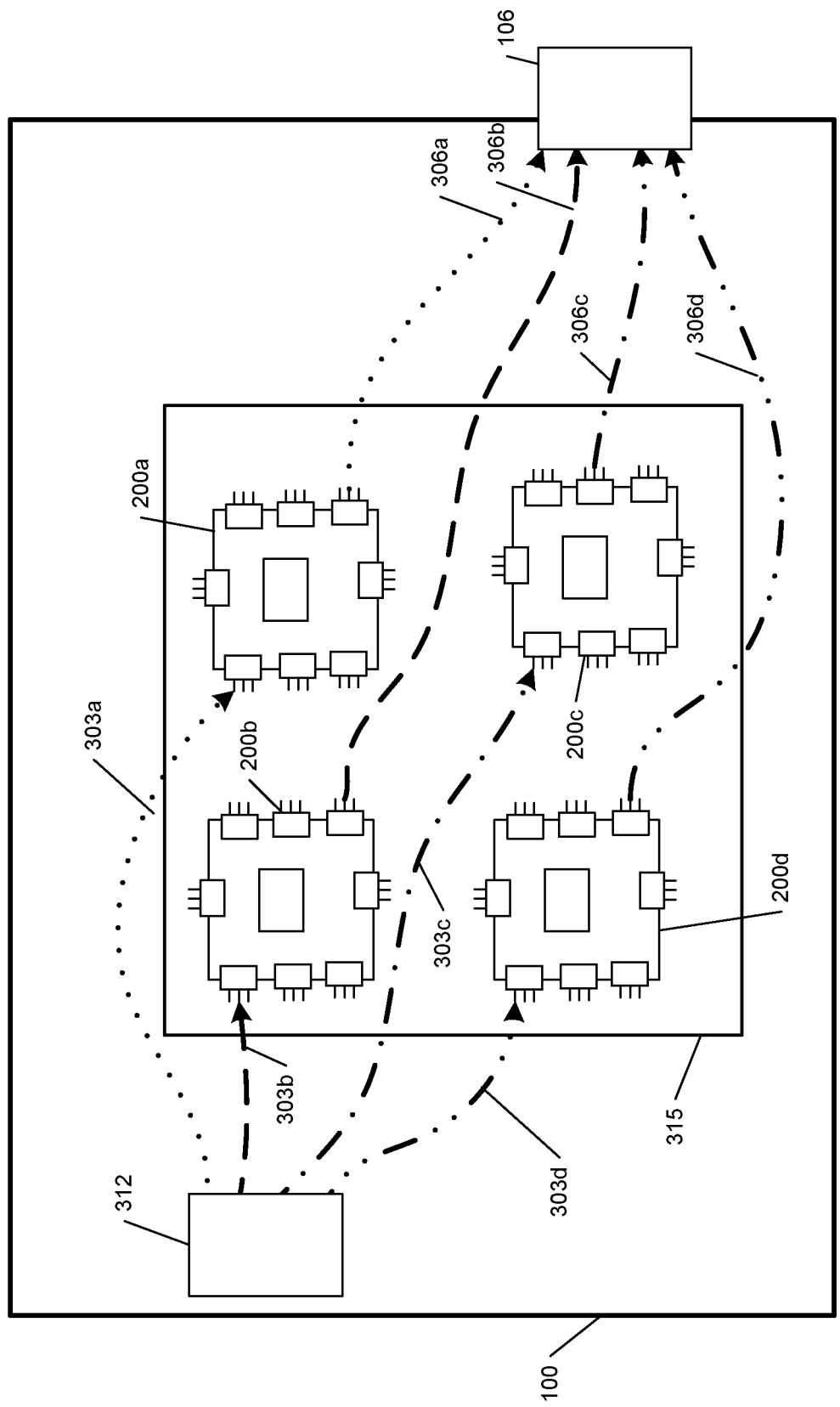
FIG. 3 is an illustration of a computing system including a plurality of processing devices in accordance with an embodiment of the present disclosure.

As illustrated in FIG. 3, a system 100 may comprise a plurality of processing devices 200a-d such as those discussed above in relation to FIG. 2. One or more of the processing devices 200a-d may be on a common PCB 315 or may be separated.

The system 100 may also comprise one or more optical interfaces 106 such as described above in relation to FIG. 1. The optical interface 106 may be pluggably connectable to an external optic fiber 109 as illustrated in FIG. 1 which may carry multiplexed signals from each of the ASICs 200a-d. The optical interface 106 may be capable of receiving optical signals from one or more of the processing devices 200a-d and multiplexing the received optical signals onto a single fiber line 109/109a-c. In this way, the single fiber line may carry data from each of the processing devices 200a-d simultaneously at different wavelengths as described herein.

The system 100 may further comprise one or more light sources 312, such as an ELS. The light sources 312 may be connected to the system 100 or may be embedded in the system 100 itself. The light sources 312 may be external to the system or may be internal to the system.

A light source 312 may be capable of outputting light onto one or more optic fibers. The light output from the light source 312 may be at a particular wavelength or range of wavelengths. In some embodiments, a separate light source 312, such as an ELS, may be used to output a particular wavelength of light. For example, a system 100 comprising four processing devices 200a-d may comprise four separate ELSs 312. Each light source may provide a constant stream of light (e.g., a continuous wave) to one or more electrical-to-optical (E-O) converter(s) in the ASIC package. Each ASIC may modulate a signal onto this light wave. In this way, each ELS may output an optic signal of a different wavelength or range of wavelengths.

The system 100 may comprise optic fibers 303a-d connecting processing devices 200a-d to one or more light sources 312 and optic fibers 306a-d connecting the processing devices 200a-d to one or more interfaces 106.

Instead of using electrical cables connecting processing devices 200 to ports 106, the processing devices 200 in a system 100 as described herein can be connected to interfaces using optic fibers 303a-d, 306a-d. Using an optical connection as opposed to an electrical connection provides a benefit as electrical connections are lossy as compared to optical connections which are virtually lossless. Furthermore, power requirements for the system 100 may be reduced as power which would otherwise be used compensating for a lossy connection is unneeded.

The optic fibers 303a-d, 306a-d, 309a-d, illustrated in FIGS. 3-7 are shown in a variety of line styles (i.e., dashed, dotted, dash-dot-dashed, and dash-dot-dot-dashed) to represent different wavelengths. It should be appreciated that while the optic fibers 303a-d, 306a-d, 309a-d are illustrated as single lines, each may be connected in a pair, such as to allow for receiving and transmitting signals.

In one or more of the embodiments described herein, each processing device 200a-d is connected to an interface 106 via a separate optic fiber 306a-d and each processing device 200a-d is connected to a light source 312 via a separate optic fiber 303a-d.

By using separate optic fibers 303a-d connecting each processing device 200a-d to a light source 312, each processing device 200a-d may receive light of a different wavelength as compared to each other processing device 200a-d.

Each processing device 200a-d may be configured to output data at a same wavelength as the light received from the light source 312. By providing each processing device 200a-d with light of a different wavelength or range of wavelengths, each device may output data to an interface 106 on a respective fiber line 306a-d at a different wavelength. Because each processing device 200a-d outputs data at the same wavelength as the light the processing device 200a-d receives from a light source 312, no retiming is necessary, avoiding the necessity of including retiming circuitry in the system 100 and/or avoiding the necessity of retiming data transmitted by a processing device 200a-d.

In one or more of the embodiments described herein, a number of wavelengths output by one or more light sources 312 may equal the number of processing devices 200a-d of the system 100. For example, a system 100 may comprise two light sources 312 and two processing devices 200, four light sources 312 and four processing devices 200, eight light sources 312 and eight processing devices 200, etc.

Figure 7:
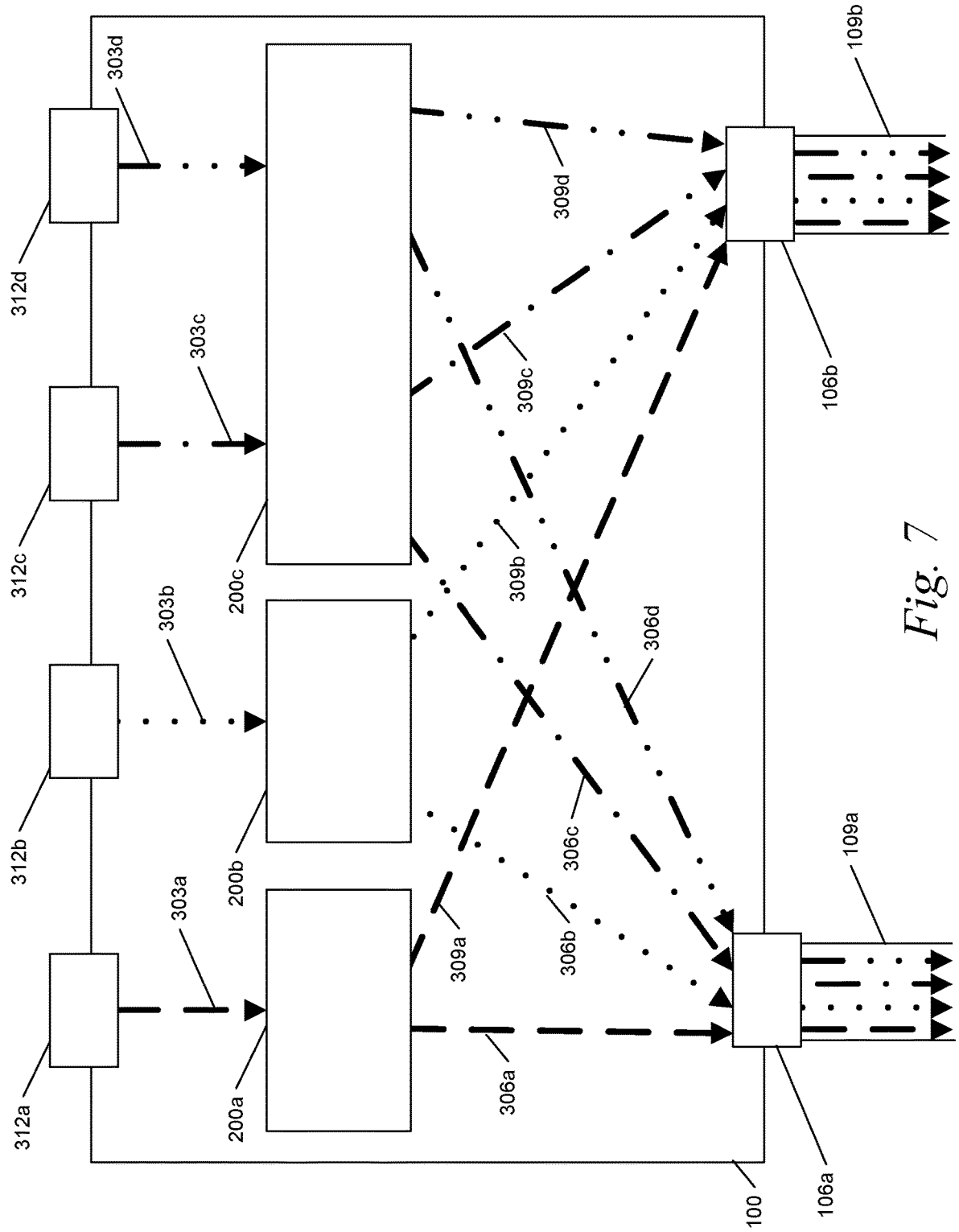
FIG. 7 is an illustration of a computing system including a plurality of processing devices in accordance with an embodiment of the present disclosure.

It should also be appreciated that in one or more embodiments, a single ASIC may receive light of a plurality different wavelength from one or more light sources 312 via multiple optic fibers and may be capable of outputting data at each wavelength, such as illustrated in FIG. 7 and described below.

Using a system as described herein, each processing device 200a-d may output data at a respective wavelength that is already appropriate for the WDM, CWDM, DWDM, or other type of multiplexing. For example, each one of four host-ASICs of a system may be capable of transmitting data in a different wavelength, eliminating the need to change wavelengths of signals of each in order to multiplex data into a WDM optical interface.

In this way, each processing device 200 in the system 100 does not need to be programmed for a particular wavelength. Instead, the processing device 200 receives light of a particular wavelength and adds output data to the light at that wavelength.

In one or more of the embodiments described herein, a processing device 200 may be designed to be capable of outputting data onto light of any one of a variety of wavelengths. This way, no matter which wavelength is received by the processing device 200, the processing device 200 can output an optical signal.

A simplified illustration of a system 100 comprising a similar set of elements as those of FIG. 3, discussed above, is illustrated in FIG. 4. In such an embodiment, a single light source 312 is used to provide light on an optic fiber 303a-d of a distinct respective wavelength to each one of four processing devices 200a-d.

A first processing device 200a receives light on a first optic fiber 303a at a first wavelength from the light source 312, a second processing device 200b receives light on a second optic fiber 303b at a second wavelength from the light source 312, a third processing device 200c receives light on a third optic fiber 303c at a third wavelength from the light source 312, and a fourth processing device 200d receives light on a fourth optic fiber 303d at a fourth wavelength from the light source 312.

Figure 4:
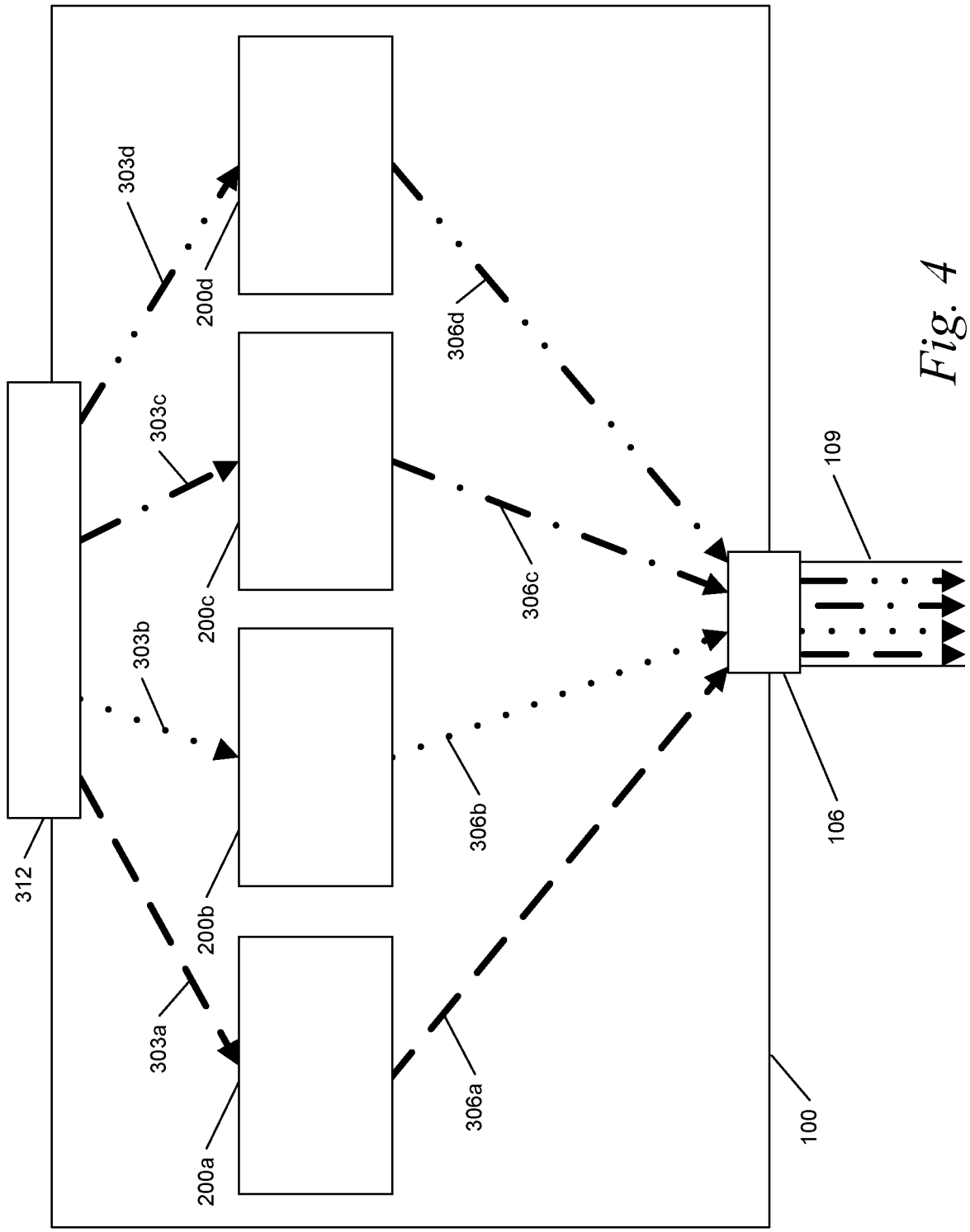
FIG. 4 is an illustration of a computing system including a plurality of processing devices in accordance with an embodiment of the present disclosure.

After receiving light of a particular wavelength via an optic fiber 303a-d, each processing device 200a-d may be capable of outputting data onto the received light and outputting the data as an optical data signal to one or more interfaces 106 via a respective optic fiber 306a-d. For example, each processing device 200a-d may modulate a signal onto the received light. As illustrated in FIG. 4, a first processing device 200a receives light on a first optic fiber 303a at a first wavelength from the light source 312 and outputs a data signal to the interface at the first wavelength on optic fiber 306a, a second processing device 200b receives light on a second optic fiber 303b at a second wavelength from the light source 312 and outputs a data signal to the interface at the second wavelength on optic fiber 306b, a third processing device 200c receives light on a third optic fiber 303c at a third wavelength from the light source 312 and outputs a data signal to the interface at the third wavelength on optic fiber 306c, and a fourth processing device 200d receives light on a fourth optic fiber 303d at a fourth wavelength from the light source 312 and outputs a data signal to the interface at the fourth wavelength on optic fiber 306d.

Each of the data signal from the first processing device 200a at the first wavelength on optic fiber 306a, data signal from the second processing device 200b to the interface at the second wavelength on optic fiber 306b, the data signal from the third processing device 200c to the interface at the third wavelength on optic fiber 306c, and the data signal from the fourth processing device 200d to the interface at the fourth wavelength on optic fiber 306d are received at the optical interface 106 and are multiplexed such as to be output from the system 100 onto a single optic fiber 109.

Figure 5:
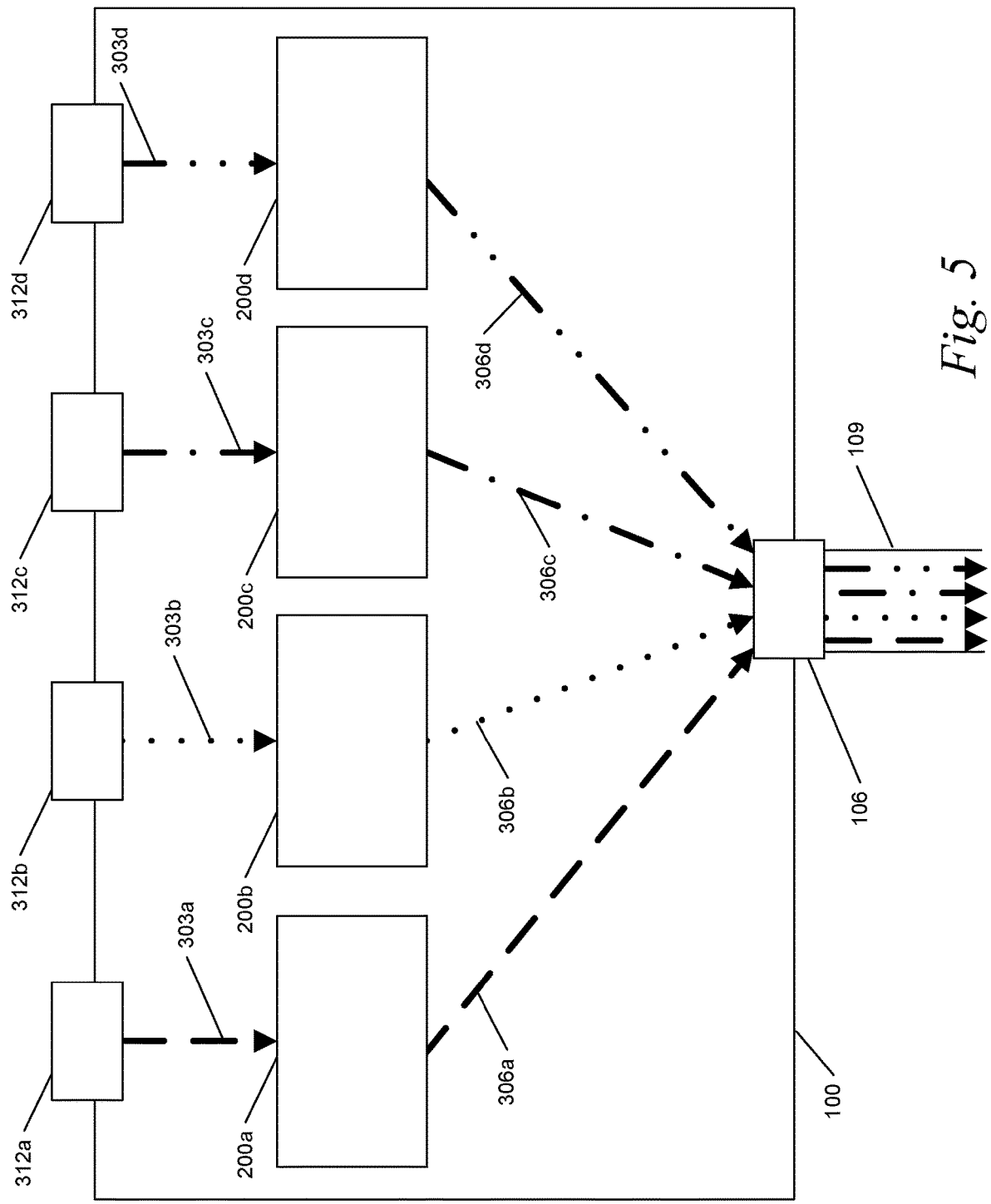
FIG. 5 is an illustration of a computing system including a plurality of processing devices in accordance with an embodiment of the present disclosure.

In accordance with one or more embodiments described herein, a system 100 may comprise four light sources 312a-d, such as ELSs, each feeding light on a respective optic fiber 303a-d of a particular wavelength to a different one of four processing devices 200a-d as illustrated in FIG. 5.

Similar to the system of FIG. 4, described above, a first processing device 200a receives light on a first optic fiber 303a at a first wavelength from a first light source 312a, a second processing device 200b receives light on a second optic fiber 303b at a second wavelength from a second light source 312b, a third processing device 200c receives light a third optic fiber 303c at a third wavelength from a third light source 312c, and a fourth processing device 200d receives light on a fourth optic fiber 303d at a fourth wavelength from a fourth light source 312d.

After receiving light of a particular wavelength via an optic fiber 303a-d from a distinct light source 312a-d, each processing device 200a-d may be capable of outputting data onto the received light and outputting the data as an optical data signal to one or more interfaces 106 via a respective optic fiber 306a-d. As illustrated in FIG. 5, a first processing device 200a receives light on a first optic fiber 303a at a first wavelength from the light source 312a and outputs a data signal to the interface at the first wavelength on optic fiber 306a, a second processing device 200b receives light on a second optic fiber 303b at a second wavelength from the light source 312b and outputs a data signal to the interface at the second wavelength on optic fiber 306b, a third processing device 200c receives light on a third optic fiber 303c at a third wavelength from the light source 312c and outputs a data signal to the interface at the third wavelength on optic fiber 306c, and a fourth processing device 200d receives light on a fourth optic fiber 303d at a fourth wavelength from the light source 312d and outputs a data signal to the interface at the fourth wavelength on optic fiber 306d.

Each of the data signal from the first processing device 200a at the first wavelength on optic fiber 306a, data signal from the second processing device 200b to the interface at the second wavelength on optic fiber 306b, the data signal from the third processing device 200c to the interface at the third wavelength on optic fiber 306c, and the data signal from the fourth processing device 200d to the interface at the fourth wavelength on optic fiber 306d are received at the optical interface 106 and are multiplexed such as to be output from the system 100 onto a single optic fiber 109.

Figure 6:
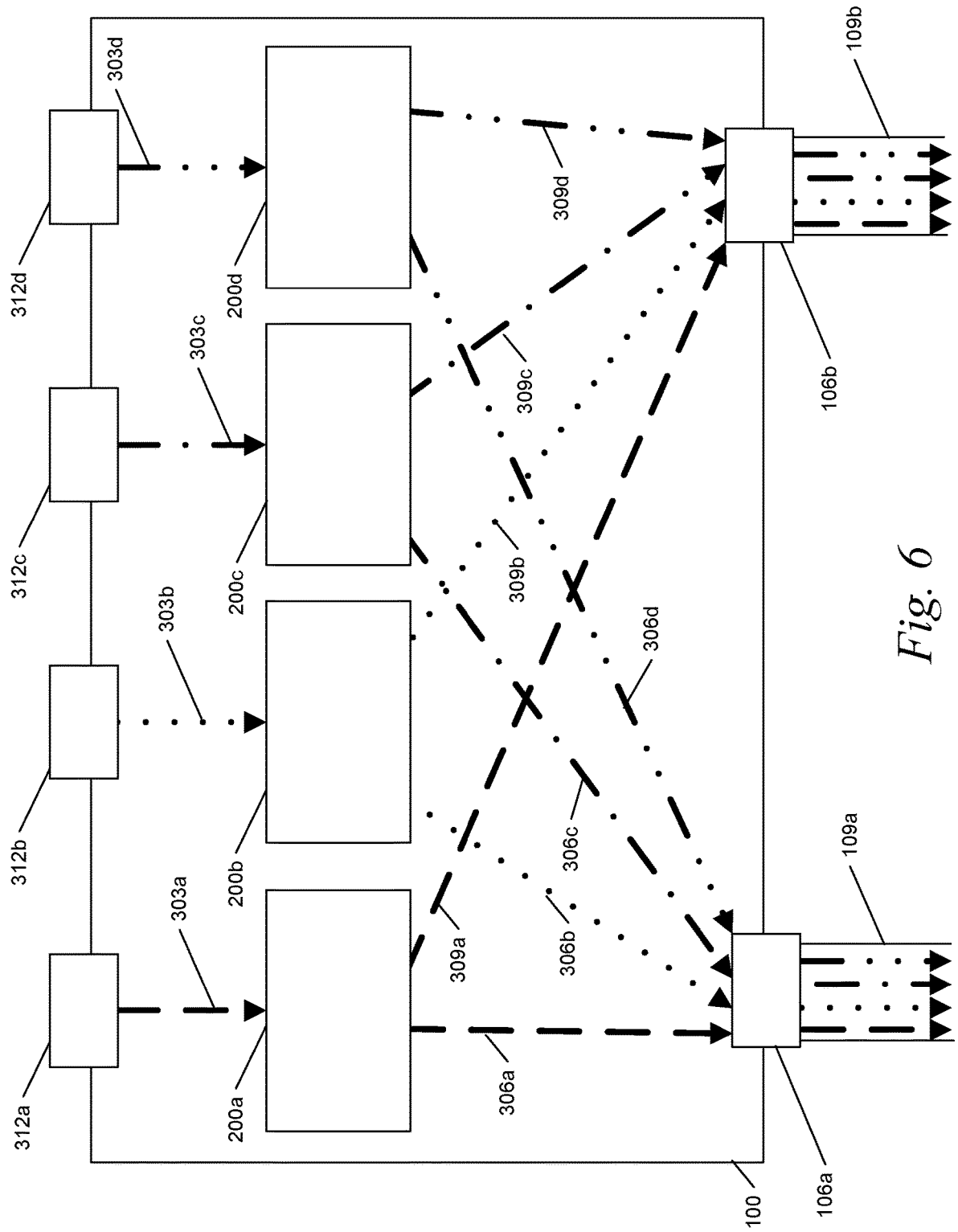
FIG. 6 is an illustration of a computing system including a plurality of processing devices in accordance with an embodiment of the present disclosure.

As illustrated in FIG. 6, each processing device 200a-d may be connected to two interfaces 106a, 106b. Similar to the system of FIG. 5, described above, a first processing device 200a receives light on a first optic fiber 303a at a first wavelength from a first light source 312a, a second processing device 200b receives light on a second optic fiber 303b at a second wavelength from a second light source 312b, a third processing device 200c receives light on a third optic fiber 303c at a third wavelength from a third light source 312c, and a fourth processing device 200d receives light on a fourth optic fiber 303d at a fourth wavelength from a fourth light source 312d.

After receiving light of a particular wavelength via an optic fiber 303a-d from a distinct light source 312a-d, each processing device 200a-d may be capable of outputting a first set of data onto the received light and outputting the first set of data as a first optical data signal to a first interface 106a via a first respective optic fiber 306a-d. Each processing device 200a-d may also be capable of outputting a second set of data onto the received light and outputting the second set of data as a second optical data signal to a second interface 106b via a second respective optic fiber 309a-d.

As illustrated in FIG. 6, a first processing device 200a receives light on a first optic fiber 303a at a first wavelength from the light source 312a and outputs a first data signal to a first interface 106a at the first wavelength on optic fiber 306a and a second data signal to a second interface 106b at the first wavelength on optic fiber 309a, a second processing device 200b receives light on a second optic fiber 303b at a second wavelength from the light source 312b and outputs a first data signal to the first interface 106a at the second wavelength on optic fiber 306b and a second data signal to the second interface 106b at the second wavelength on optic fiber 309b, a third processing device 200c receives light on a third optic fiber 303c at a third wavelength from the light source 312c and outputs a first data signal to the first interface 106a at the third wavelength on optic fiber 306c and a second data signal to the second interface 106b at the third wavelength on optic fiber 309c, and a fourth processing device 200d receives light on a fourth optic fiber 303d at a fourth wavelength from the light source 312d and outputs a first data signal to the first interface 106a at the fourth wavelength on optic fiber 306d and a second data signal to the second interface 106b at the fourth wavelength on optic fiber 309d.

Each of the data signal from the first processing device 200a to the first interface 106a at the first wavelength on optic fiber 306a, the data signal from the second processing device 200b to the first interface 106a at the second wavelength on optic fiber 306b, the data signal from the third processing device 200c to the first interface 106a at the third wavelength on optic fiber 306c, and the data signal from the fourth processing device 200d to the first interface 106a at the fourth wavelength on optic fiber 306d are received at the first interface 106a and are multiplexed such as to be output from the system 100 onto a first single optic fiber 109a.

Each of the data signal from the first processing device 200a to the second interface 106b at the first wavelength on optic fiber 309a, the data signal from the second processing device 200b to second interface 106b at the second wavelength on optic fiber 309b, the data signal from the third processing device 200c to the second interface 106b at the third wavelength on optic fiber 309c, and the data signal from the fourth processing device 200d to the second interface 106b at the fourth wavelength on optic fiber 309d are received at the second interface 106b and are multiplexed such as to be output from the system 100 onto a second single optic fiber 109b.

As illustrated in FIG. 7, in some embodiments, one ASIC or more ASICs may each be connected to an interface using multiple optical fibers at different wavelengths Similar to the system of FIGS. 5 and 6, described above, a first processing device 200a receives light on a first optic fiber 303a at a first wavelength from a first light source 312a, a second processing device 200b receives light on a second optic fiber 303b at a second wavelength from a second light source 312b, and a third processing device 200c receives light on a third optic fiber 303c at a third wavelength from a third light source 312c and light on a fourth optic fiber 303d at a fourth wavelength from a fourth light source 312d.

After receiving light of a particular wavelength via an optic fiber 303a-d from a distinct light source 312a-d, each processing device 200a-d may be capable of outputting a first set of data onto the received light and outputting the first set of data as a first optical data signal to a first interface 106a via a first respective optic fiber 306a-d. Each processing device 200a-d may also be capable of outputting a second set of data onto the received light and outputting the second set of data as a second optical data signal to a second interface 106b via a second respective optic fiber 309a-d.

As illustrated in FIG. 7, a first processing device 200a receives light on a first optic fiber 303a at a first wavelength from the light source 312a and outputs a first data signal to a first interface 106a at the first wavelength on optic fiber 306a and a second data signal to a second interface 106b at the first wavelength on optic fiber 309a, a second processing device 200b receives light on a second optic fiber 303b at a second wavelength from the light source 312b and outputs a first data signal to the first interface 106a at the second wavelength on optic fiber 306b and a second data signal to the second interface 106b at the second wavelength on optic fiber 309b, and a third processing device 200c receives light on a third optic fiber 303c at a third wavelength from the light source 312c and receives light on a fourth optic fiber 303d at a fourth wavelength from the light source 312d. The third processing device 200c outputs a first data signal to the first interface 106a at the third wavelength on optic fiber 306c, a second data signal to the second interface 106b at the third wavelength on optic fiber 309c, a third data signal to the first interface 106a at the fourth wavelength on optic fiber 306d, and a fourth data signal to the second interface 106b at the fourth wavelength on optic fiber 309d.

Each of the data signal from the first processing device 200a to the first interface 106a at the first wavelength on optic fiber 306a, the data signal from the second processing device 200b to the first interface 106a at the second wavelength on optic fiber 306b, the data signal from the third processing device 200c to the first interface 106a at the third wavelength on optic fiber 306c, and the data signal from the third processing device 200c to the first interface 106a at the fourth wavelength on optic fiber 306d are received at the first interface 106a and are multiplexed such as to be output from the system 100 onto a first single optic fiber 109a.

Each of the data signal from the first processing device 200*a* to the second interface 106*b* at the first wavelength on optic fiber 309*a*, the data signal from the second processing device 200*b* to second interface 106*b* at the second wavelength on optic fiber 309*b*, the data signal from the third processing device 200*c* to the second interface 106*b* at the third wavelength on optic fiber 309*c*, and the data signal from the third processing device 200*c* to the second interface 106*b* at the fourth wavelength on optic fiber 309*d* are received at the second interface 106*b* and are multiplexed such as to be output from the system 100 onto a second single optic fiber 109*b*.

Figure 8:
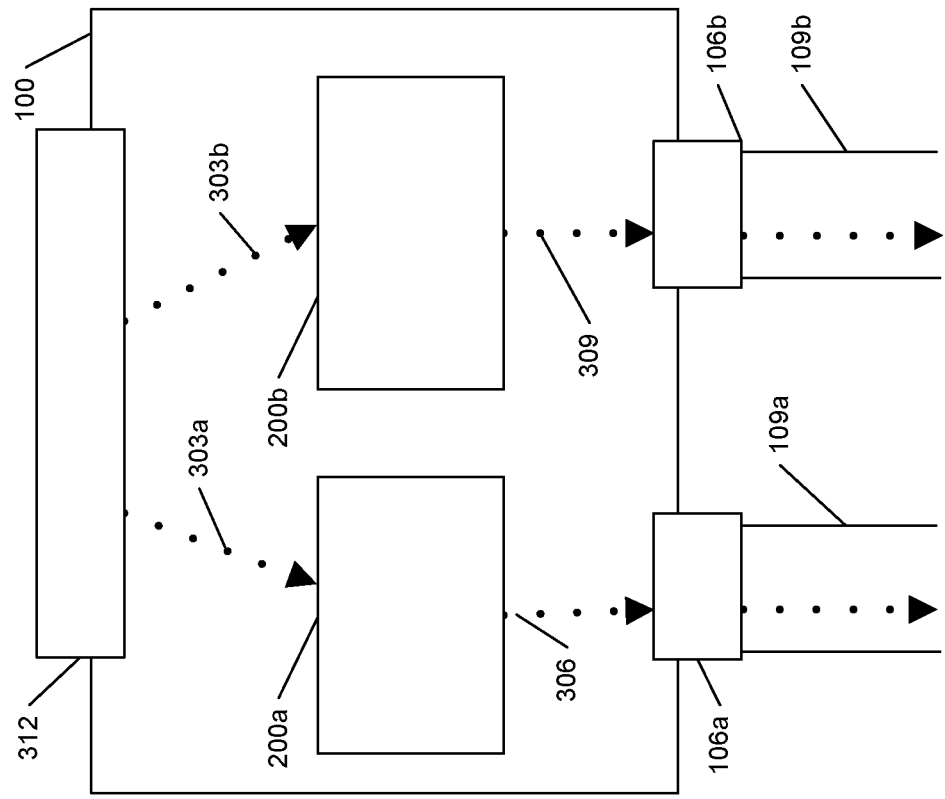
FIG. 8 is an illustration of a computing system including a plurality of processing devices in accordance with an embodiment of the present disclosure.

As illustrated in FIG. 8, one or more processing devices 200*a*, 200*b* may be connected to different interfaces 106*a*, 106*b* and may be supplied with light of a common wavelength via respective optic fibers 303*a*, 303*b*. A first processing device 200*a* receives light on a first optic fiber 303*a* at a first wavelength from a light source 312 and a second processing device 200*b* receives light on a second optic fiber 303*b* at the first wavelength from the light source 312.

After receiving light of the wavelength via a respective optic fiber 303*a*, 303*b* from the light source 312, each processing device 200*a*, 200*b* may output a set of data onto the received light and output the set of data as an optical data signal to a respective interface 106*a*, 106*b* via a respective optic fiber 306, 309.

The data signal from the first processing device 200*a* to the first interface 106*a* at the first wavelength on optic fiber 306 may be received at the first interface 106*a* and may be multiplexed with one or more other signals and be output from the system 100 onto a first single optic fiber 109*a*.

The data signal from the second processing device 200*b* to second interface 106*b* at the first wavelength on optic fiber 309 may be received at the second interface 106*b* and may be multiplexed with one or more other signals and be output from the system 100 onto a second single optic fiber 109*b*.

Figure 9:
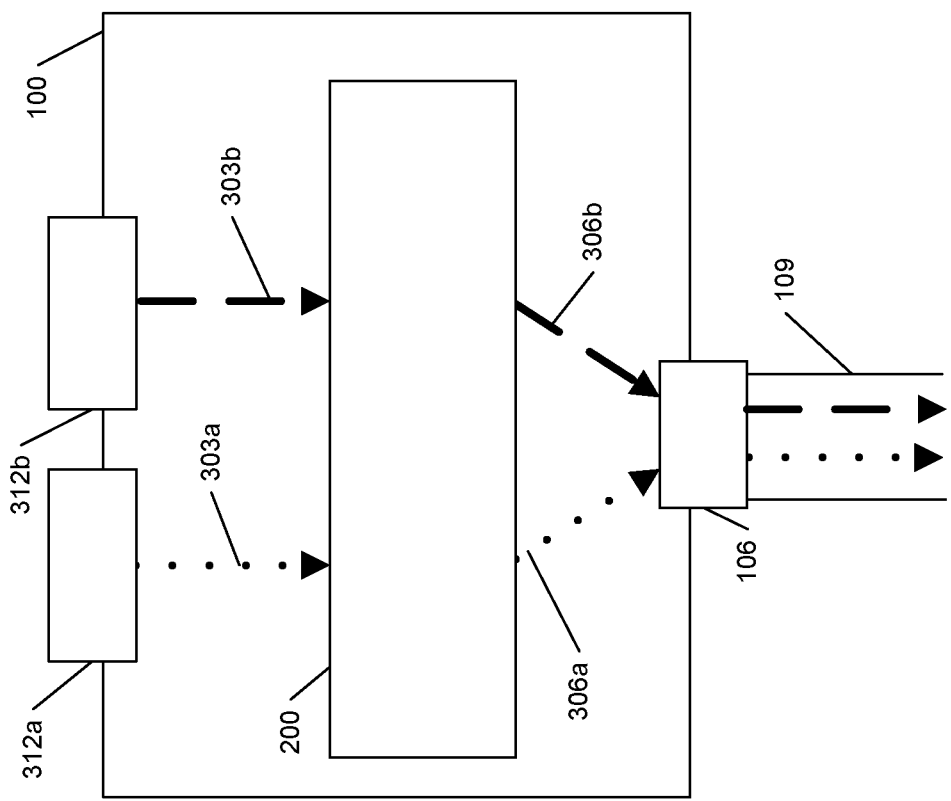
FIG. 9 is an illustration of a computing system including a plurality of processing devices in accordance with an embodiment of the present disclosure.

In accordance with one or more embodiments described herein, a system 100 may comprise two or more light sources 312*a*, 312*b*, such as ELSs, each feeding light on a respective optic fiber 303*a*, 303*b* of a particular wavelength to one processing device 200 as illustrated in FIG. 9.

The processing device 200 receives light on a first optic fiber 303*a* at a first wavelength from a first light source 312*a* and a second processing device 200*b* receives light on a second optic fiber 303*b* at a second wavelength from a second light source 312*b*.

After receiving light of particular wavelengths via an optic fiber 303*a*, 303*b* from a distinct light source 312*a*, 312*b*, the processing device 200 may be capable of outputting data onto the received light and outputting the data as an optical data signal to an interface 106 via a respective optic fiber 306*a*, 306*b*.

As illustrated in FIG. 9, the processing device 200 receives light on a first optic fiber 303*a* at a first wavelength from the light source 312*a* and outputs a data signal to the interface 106 at the first wavelength on optic fiber 306*a*. The processing device 200 also receives light on a second optic fiber 303*b* at a second wavelength from the light source 312*b* and outputs a data signal to the interface 106 at the second wavelength on optic fiber 303.

Each of the data signal at the first wavelength on optic fiber 306*a* and the data signal at the second wavelength on optic fiber 306*b* may be received at the optical interface 106 and may be multiplexed such as to be output from the system 100 onto a single optic fiber 109.

While the examples illustrated in the description provided herein show each processing device 200 being connected to each interface 106, it should be appreciated it is not necessary for every processing device to be connected to every interface.

While the examples illustrated in the description provided herein show embodiments in which a system comprises one, three or four processing devices 200, one, two, or four light sources 312, and one or two interfaces 106, it should be appreciated a system may include any number of processing devices 200, light sources 312, and/or interfaces 106. Each of the elements may also be connected in any manner of an endless variety of options.

It should be appreciated, each of the functions performed by the processing devices 200*a-d* as illustrated in FIGS. 4-9 may be performed by a single processing device 200 or by any number of processing devices. For example, a single ASIC may be capable of outputting any number of optical signals at any number of wavelengths to any number of interfaces 106. By way of illustration, a first processing device 200*a* may output a first optical signal 306 at a first wavelength to a first interface 106*a* and a second optical signal 309 at the first wavelength to a second interface 106*b*. Similarly, a first processing device 200*a* may output a first optical signal 306*a* at a first wavelength to a first interface 106*a* and a second optical signal 306*b* at a second wavelength to the first interface 106*b*. It should be appreciated that the examples provided herein are provided for example purposes only and any combination not explicitly described is further contemplated and not every possible arrangement of components is illustrated or described herein.

As another example provided for illustrative purposes, in an embodiment a system 100 may comprise two sets of two processing devices 200. In a first set, a first processing device 200 outputs a first signal to a first interface via a first optic fiber at a first wavelength and a second processing device 200 outputs a second signal to the first interface via a second optic fiber at a second wavelength. The first signal and the second signal may be multiplexed at a front panel of the system onto a single fiber. In a second set, a third processing device 200 outputs a third signal to a second interface via a third optic fiber at a third wavelength and a fourth processing device 200 outputs a fourth signal to the second interface via a fourth optic fiber at a fourth wavelength. The third signal and the fourth signal may be multiplexed at a front panel of the system onto a single fiber. It should be appreciated that either of the first and second wavelengths may be the same as or similar to either of the third or fourth wavelengths.

The two sets of processing devices 200 may also, or alternatively, be capable of receiving signals. For example, a signal received at the first interface, or a third interface, of the system 100 may be sent via one or more optic fibers to the first set of processing devices 200 and a signal received at the second interface, or a fourth interface, of the system 100 may be sent via one or more optic fibers to the second set of processing devices 200. The received signals may be demultiplexed at or near the interfaces on the panel of the system 100 or may be demultiplexed after being transmitted on an optic fiber to the respective set of processing devices 200.

As should be appreciated, the signals may be transmitted between processing devices and interfaces via any combination of WDM and parallel optics. Using parallel optics, signals may be transmitted between processing devices 200 and interfaces 106 using multiple fibers. Using WDM, signals may be transmitted between processing devices 200 and interfaces 106 using a single fiber on which multiple signals are multiplexed.

In some embodiments, the interface 106 may not de-multiplex the signal and may instead send the full multiplexed signal to each of a plurality of processing devices 200a-d on a respective optic fiber. Each processing device 200a-d may then de-multiplex the signal or otherwise capture data from the signal and convert the signal to electric using one or more O-E converters. In such an embodiment, each processing device 200a-d may comprise wavelength selection circuitry to select a particular wavelength or multiple particular wavelengths and capture data only at that particular wavelength or wavelengths.

Figure 10A:
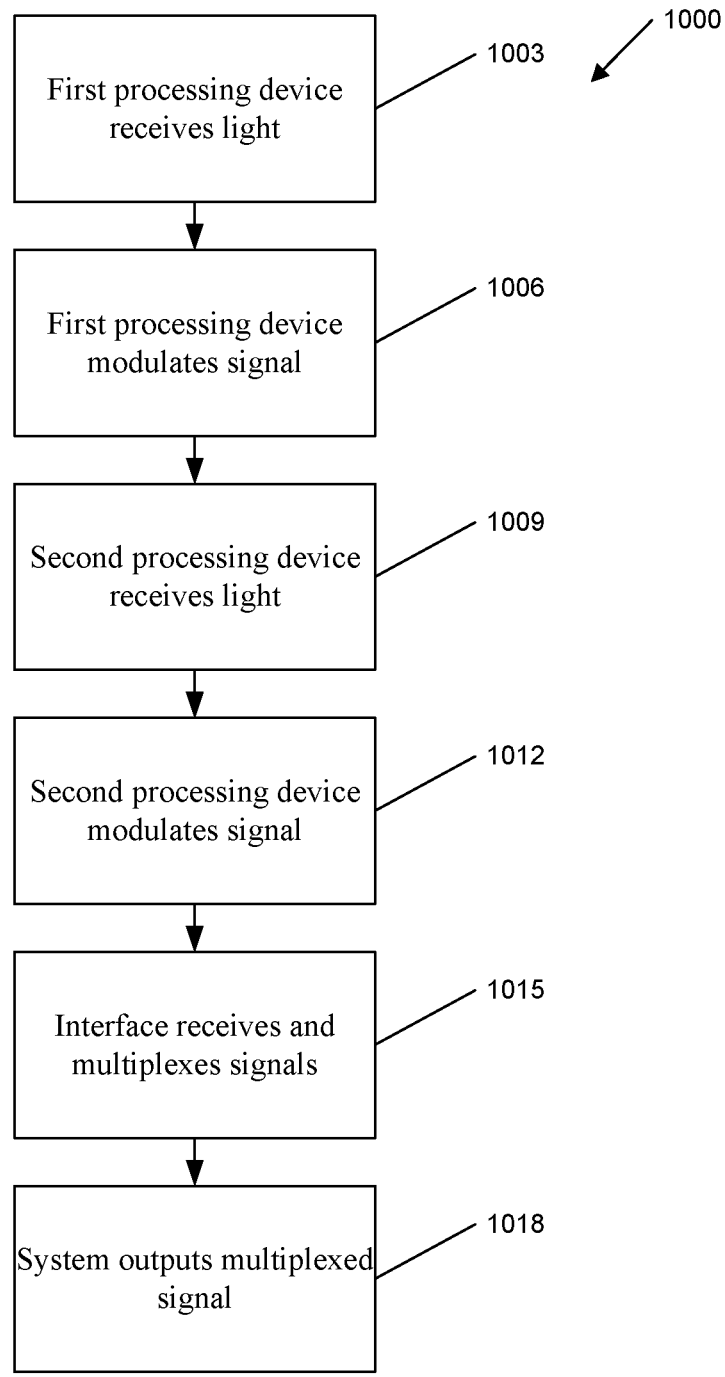
FIG. 10A is a flowchart of a method of transmitting data in accordance with an embodiment of the present disclosure.

As illustrated in FIG. 10A, a method 1000 may be implemented using a system 100 as described herein. The system 100 used in the method 1000 may include any number of processing devices 200. While the steps described below relate to a system 100 including two or more processing devices 200a, 200b, it should be appreciated additional or fewer processing devices 200 may be used in similar methods. Furthermore, the method 1000 describes the use of two distinct light sources 312a, 312b. It should be appreciated additional or fewer light sources 312 may be used in similar methods. For example, a single light source may be capable of outputting light of different wavelengths. Finally, while the method 1000 refers to only one interface 106 of a system 100, it should be appreciated the system 100 may comprise additional interfaces 106.

At 1003, a first processing device 200a of the system 100 receives light at a first wavelength from a first light source 312a via an optic fiber 303a. As illustrated in FIGS. 3-9 and as described above, a first processing device 200a may comprise an ASIC package and may be capable of receiving light from a number of sources. At 1006, the first processing device 200a modulates a signal onto the light at the first wavelength and outputs the modulated signal at the first wavelength onto an optic fiber 306a. The optic fiber 306a may connect an output of the processing device 200a to an interface 106.

At 1009, a second processing device 200b receives light at a second wavelength from a second light source 312b via an optic fiber 303b. As illustrated in FIGS. 3-9 and as described above, a second processing device 200b may comprise an ASIC package and may be capable of receiving light from a number of sources. At 1012, the second processing device 200b modulates a signal onto the light at the second wavelength and outputs the modulated signal at the second wavelength onto an optic fiber 306b. The optic fiber 306b may connect an output of the processing device 200b to the interface 106.

At 1015, the signals output by each of the first and second processing devices 200a, 200b, are received by the interface 106 at a panel of the system 100. The interface 106 multiplexes the signals into a multiplexed stream of data. At 1018, the multiplexed stream of data including both the signal output by the first processing device 200a and the signal output by the processing device 200b is output from the system 100 onto a single optic fiber.

While example embodiments have been shown and described with respect to connecting host devices to routing devices with a connection interface, the connection interface may have other uses in a network system. For example, the interface may be used to connect a set of network switches with another set of network switches in the same or similar manner as described above. In this case, the host devices (e.g., servers) are substituted for an additional set of network switches.

While embodiments described herein relate to each processing device 200a-d outputting signals at different wavelengths, it should be appreciated that in some embodiments, two or more processing devices 200a-d may output signals at the same wavelength. For example, a first processing device 200a may output a signal to a first interface at a first wavelength and a second processing device 200b may output a signal to a second interface at the first wavelength. Each of the first and second processing devices 200a, 200b may receive light from a common light source providing an input signal at the first wavelength. Moreover, it should be appreciated any other variation of input and output wavelengths are contemplated and may be utilized in various embodiments.

Figure 10B:
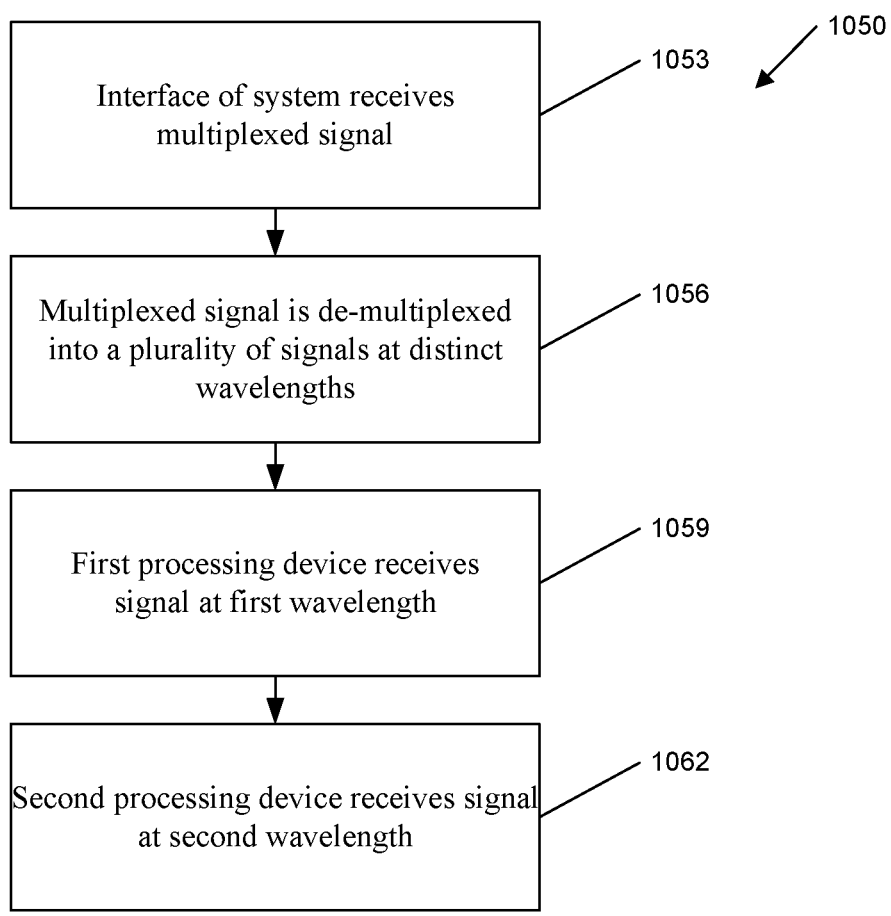
FIG. 10B is a flowchart of a method of receiving data in accordance with an embodiment of the present disclosure.

While the examples illustrated in the description provided herein show each processing device 200 transmitting data to interfaces, it should be appreciated that in some embodiments the processing devices 200 may alternatively or additionally receive data from interfaces 106. For example, as illustrated in FIG. 10B, a method 1050 of receiving data may be performed using one or more of the systems described herein.

At 1053, an interface 106 of a system 100 as described herein may receive a multiplexed signal from an external cable 109. The external cable 109 may, for example, comprise a single fiber optic cable on which two or more signals are multiplexed at different wavelengths.

At 1056, the multiplexed signal may be de-multiplexed into a plurality of signals at distinct wavelengths. The de-multiplexing of the multiplexed signal may in some embodiments be performed at the interface 106. In such an embodiment, when an interface 106 receives a multiplexed signal on an optic fiber 109, the interface 106 may de-multiplex the signal using, for example, a wavelength de-multiplexer (demux) and send a separate signal on a separate optic fiber 306a-d to a plurality of processing devices. The interface 106 may include wavelength selection circuitry to output each received wavelength in the received signal onto a different optic fiber. In some embodiments, each processing device 200 may perform a de-multiplexing of the received signal. In such an embodiment, each processing device 200 may receive the input multiplexed signal and may de-multiplex the signal to extract data at one or more particular wavelengths.

At 1059, the first processing device may receive a first signal at a first wavelength and at 1062, a second processing device may receive a second signal at a second wavelength. Upon receiving a signal, each processing device may convert the optical signal to electrical using an optical-to-electrical converter. Using a system 100 as described herein to receive data, a lossless connection from an external source to an in-system processing device such as an ASIC may be provided.

Although example embodiments have been shown and described with respect to systems having specific types of elements, numbers of elements, sizes elements, and/or shapes of elements, it should be appreciated the disclosed concepts are not limited thereto and that fewer, additional, and/or different types of elements, numbers of elements, sizes elements, and/or shapes of elements are within the scope of the disclosed concepts. In addition, the connectors described herein may be implemented as female and/or male connectors as desired.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the disclosed concepts may be otherwise variously embodied and employed, and that the appended claims are intended to be construed to include such variations, except as limited by the prior art.

It should be appreciated that the disclosed concepts cover any embodiment in combination with any one or more other embodiments, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

It will be appreciated that the embodiments described above are cited by way of example, and that the present invention is not limited to what has been particularly shown and described hereinabove. Rather, the scope of the present invention includes both combinations and sub combinations of the various features described hereinabove, as well as variations and modifications thereof which would occur to persons skilled in the art upon reading the foregoing description and which are not disclosed in the prior art.

Embodiments of the present disclosure may be configured as follows:

(1) A system, comprising: a first processing device to output a first optical signal using a first wavelength; a second processing device to output a second optical signal using a second wavelength different from the first wavelength; an optical interface; a first optical fiber connecting the first processing device to the optical interface; and a second optical fiber connecting the second processing device to the optical interface.

(2) The system of (1), wherein the first wavelength and the second wavelength are each associated with a different coarse wavelength division multiplexing (CWDM) channel or a dense wavelength division multiplexing (DWDM) channel.

(3) The system of one or more of (1) and (2), further comprising a printed circuit board (PCB) that supports the first processing device and the second processing device.

(4) The system of one or more of (1) to (3), wherein the first processing device is supported by a first PCB and the second processing device is supported by a second PCB.

(5) The system of one or more of (1) to (4), wherein the first processing device and the second processing device comprise one or more application-specific integrated circuit (ASIC) packages.

(6) The system of one or more of (1) to (5), further comprising:
a third processing device to output a third optical signal using a third wavelength different from the first wavelength and the second wavelength; and
at least a fourth processing device to output at least a fourth optical signal using a wavelength different from the first wavelength, the second wavelength, and the third wavelength.

(7) The system of one or more of (1) to (6), wherein the optical interface is one of a plurality of interfaces mounted on a housing that contains the first processing device and the second processing device.

(8) The system of one or more of (1) to (7), wherein the optical interface comprises a WDM interface.

(9) The system of one or more of (1) to (8), wherein the optical interface comprises an FR4 interface.

(10) The system of one or more of (1) to (9), wherein the optical interface is pluggably connectable to an external network.

(11) The system of one or more of (1) to (10), further comprising:
a second optical interface;
a third optical fiber connecting the first processing device to the optical interface; and
a fourth optical fiber connecting the second processing device to the optical interface.

(12) The system of one or more of (1) to (11), further comprising:
a first light source coupled with the first processing device, wherein the first light source enables the first processing device to output the first optical signal using the first wavelength; and
a second light source coupled with the second processing device, wherein the second light source enables the second processing device to output the second optical signal using the second wavelength.

(13) The system of one or more of (1) to (12), further comprising a light source coupled with the first processing device and the second processing device, wherein the light source provides light of the first wavelength to the first processing device and the second processing device, wherein the first processing device outputs the first optical signal to the optical interface via the first optical fiber at the first wavelength and the second processing device outputs a third optical signal to a second optical interface at the first wavelength.

(14) The system of one or more of (1) to (13), wherein the first processing device and the second processing device each comprise one or more of a central processing unit (CPU), an application-specific integrated circuit (ASIC), a graphics processing unit (GPU), a network interface card (NIC) and a data processing unit (DPU).

(15) The system of one or more of (1) to (14), further comprising a third optical fiber connecting the first processing device to the optical interface, wherein the first processing device outputs a third optical signal using a third wavelength different from the first and second wavelengths

(16) The system of one or more of (1) to (15), wherein the first optical signal and the second optical signal are multiplexed onto a single optical fiber at the optical interface.

(17) The system of one or more of (1) to (16), wherein the single optical fiber carries the first optical signal and the second optical signal simultaneously.

(18) A switching system, comprising: one or more processing devices, each of the processing devices comprising one or more circuits that facilitate switching functions; an optical interface in optical communication with the processing devices, wherein the processing devices exchange optical signals with the optical interface using different optical wavelengths.

(19) The switching system of (18), further comprising a substrate on which the processing devices and the optical interface are provided, one or more optical chips are provided on the substrate, wherein the optical chips convert electrical signals to and from optical signals.

(20) The switching system of one or more of (18) and (19), further comprising:
a housing in which the processing devices and the optical interface are contained; and
two or more optical fibers that connect the processing devices to the optical interface, respectively.

(21) A switch, comprising: a first processing device to output a first optical signal using a first wavelength; a second processing device to output a second optical signal; an optical interface; a first optical fiber connecting the first processing device to the optical interface; and a second optical fiber connecting the second processing device to the optical interface.

(22) The switch of (21), wherein the first wavelength and the second wavelength are each associated with a different coarse wavelength division multiplexing (CWDM) channel or a dense wavelength division multiplexing (DWDM) channel.

(23) The switch of one or more of (21) and (22), wherein the first processing device and the second processing device comprise one or more application-specific integrated circuit (ASIC) packages.

What is claimed is:

1. A system, comprising:
a first switch to route a first electrical signal from an input of the first switch to an output of the first switch to output a first optical signal that corresponds to the routed first electrical signal, the first optical signal having a first wavelength;
a second switch to route a second electrical signal from an input of the second switch to an output of the second switch to output a second optical signal that corresponds to the routed second electrical signal, the second optical signal having a second wavelength different from the first wavelength; and
a first optical interface comprising a connector to connect to a first external device external to the system, wherein the first optical interface is to receive and multiplex the first and second optical signals to form a combined optical signal and to output the combined optical signal to the first external device via the connector.

2. The system of claim 1, wherein the first wavelength and the second wavelength are each associated with a different coarse wavelength division multiplexing (CWDM) channel or a dense wavelength division multiplexing (DWDM) channel.

3. The system of claim 1, wherein the first switch comprises an application-specific integrated circuit (ASIC) co-packaged with one or more optical-electrical converters.

4. The system of claim 1, wherein the first switch comprises an application-specific integrated circuit (ASIC), and wherein the system further comprises one or more electrical-optical converters connected to the first switch.

5. The system of claim 1, wherein the first switch and the second switch comprise one or more application-specific integrated circuit (ASIC) packages.

6. The system of claim 1, further comprising:
a third switch to output a third optical signal using a third wavelength different from the first wavelength and the second wavelength; and
at least a fourth switch to output at least a fourth optical signal using a fourth wavelength different from the first wavelength, the second wavelength, and the third wavelength.

7. The system of claim 1, wherein the first optical interface is mounted on a housing that contains the first switch and the second switch.

8. The system of claim 1, wherein the first optical interface comprises a WDM interface.

9. The system of claim 1, wherein the first optical interface comprises an FR4 interface.

10. The system of claim 1, wherein the first optical interface is pluggably connectable to an external network.

11. The system of claim 1, further comprising:
a first light source coupled with the first switch, wherein the first light source enables the first switch to output the first optical signal using the first wavelength; and
a second light source coupled with the second switch, wherein the second light source enables the second switch to output the second optical signal using the second wavelength.

12. The system of claim 1, further comprising a light source coupled with the first switch and the second switch, wherein the light source provides light of the first wavelength to the first switch and the second switch, wherein the first switch outputs the first optical signal to the first optical interface via a first optical fiber and the second switch outputs the second optical signal to the first optical interface via a second optical fiber.

13. The system of claim 1, wherein the first switch and the second switch each comprise one or more of a central processing unit (CPU), an application-specific integrated circuit (ASIC), a graphics processing unit (GPU), a network interface card (NIC) and a data processing unit (DPU).

14. The system of claim 1, wherein the first switch outputs a third optical signal using a third wavelength different from the first and second wavelengths.

15. The system of claim 1, wherein the connector connects to a first output optical fiber.

16. The system of claim 1, further comprising:
a housing that houses the first and second switches and the first optical interface, wherein the first external device is external to the housing.

17. The system of claim 1, wherein the system receives external light enabling one or more of the first switch to output the first optical signal using the first wavelength and the second switch to output the second optical signal using the second wavelength.

18. The system of claim 1, further comprising:
a second optical interface;
a first optical fiber connecting the output of the first switch to a first input of the first optical interface;
a second optical fiber connecting the output of the second switch to a second input of the first optical interface;
a third optical fiber connecting a second output of the first switch to a first input of the second optical interface; and
a fourth optical fiber connecting a second output of the second switch to a second input of the second optical interface.

19. A switching system, comprising:
a first processing device to output a first optical signal using a first wavelength;
a second processing device to output a second optical signal using a second wavelength different from the first wavelength;
an optical interface;
a first optical fiber connecting the first processing device to the optical interface;
a second optical fiber connecting the second processing device to the optical interface; and
a third optical fiber connecting the first processing device to the optical interface, wherein the first processing device outputs a third optical signal using a third wavelength different from the first and second wavelengths.

20. The switching system of claim 19, further comprising a substrate on which the first and second processing devices and the optical interface are provided wherein, one or more optical chips are provided on the substrate, wherein the one or more optical chips convert electrical signals to optical signals and optical signals to electrical signals.

21. The switching system of claim 19, further comprising:
a housing in which the first and second processing devices and the optical interface are contained.

22. A switch, comprising:
a first processing device to output a first optical signal using a first wavelength;
a second processing device to output a second optical signal using a second wavelength different from the first wavelength;
a first optical interface;
a first optical fiber connecting the first processing device to the first optical interface;
a second optical fiber connecting the second processing device to the first optical interface; and
at least one light source coupled with the first processing device and the second processing device,
wherein the at least one light source provides light of the first wavelength to the first processing device and the second processing device, and
wherein the first processing device outputs the first optical signal to the first optical interface via the first optical fiber at the first wavelength and the second processing device outputs a third optical signal to a second optical interface at the first wavelength.

23. The switch of claim 22, wherein the first wavelength and the second wavelength are each associated with a different coarse wavelength division multiplexing (CWDM) channel or a dense wavelength division multiplexing (DWDM) channel.

24. The switch of claim 23, wherein the first processing device and the second processing device comprise one or more application-specific integrated circuit (ASIC) packages.

* * * * *